March 16, 1965     T. H. GROVE     3,173,438
APPARATUS FOR MEASURING AND CONTROLLING LIQUID VISCOSITY
Filed Aug. 8, 1962     3 Sheets-Sheet 1

THOMAS H. GROVE
INVENTOR.

BY E. J. Berry

March 16, 1965  T. H. GROVE  3,173,438
APPARATUS FOR MEASURING AND CONTROLLING LIQUID VISCOSITY
Filed Aug. 8, 1962  3 Sheets-Sheet 3

THOMAS H. GROVE
INVENTOR.

BY E. J. Berry

3,173,438
APPARATUS FOR MEASURING AND CONTROLLING LIQUID VISCOSITY
Thomas H. Grove, Penfield, N.Y., assignor to National Distillers and Chemical Corporation, New York, N.Y., a corporation of Virginia
Filed Aug. 8, 1962, Ser. No. 215,572
7 Claims. (Cl. 137—92)

This invention relates to an apparatus for measuring and controlling the viscosity of a liquid, and more particularly to such an apparatus useful for measuring the viscosity of ink employed on a printing press, for automatically determining when a thinning solvent should be added to such ink, and for adding the desired amount of solvent to the ink to maintain a substantially constant ink viscosity.

It is among the objects of the present invention to provide an apparatus for measuring and controlling the viscosity of a liquid by periodically adding a viscosity adjusting liquid, e.g., a thinner or thickener, to the liquid, responsive to periodic changes in the viscosity thereof.

Other objects and advantages of this invention will be apparent from a consideration of the following detailed description thereof.

The viscosity measuring and controlling device of this invention includes a beam balance, a viscosity cup supported from one arm of the beam balance, adapted to contain a liquid whose viscosity is to be controlled and having an aperture therein permitting the liquid to be emptied from the cup thereby changing the angular disposition of the beam balance, and a switch associated with the other arm of the beam balance adapted to be actuated when the beam balance is in a first position and de-actuated when the beam balance is in a second position. A timer is associated with the switch in a manner such that the timer is energized and de-energized by the sequential actuation and de-actuation of the switch and a valve is provided for controlling the addition of a viscosity adjusting liquid to the first mentioned liquid the valve being actuated by the timer after a predetermined period of time, so long as the timer is not de-energized by de-actuating the switch prior to the expiration of the predetermined period of time.

Hence, when the beam balance is placed in a first position the switch is actuated, starting the timer. If the viscosity of the liquid contained within the viscosity cup is within the desired limits, the time required for the cup to empty and thereby effect pivoting of the beam balance into the second position is within the predetermined time to which the timer is set. In such case, pivoting of the beam balance de-actuates the switch and de-energizes the timer before it actuates the valve mechanism. If, on the other hand, the viscosity of the liquid is such that a period in excess of the predetermined time is required to empty the viscosity cup, the timer is not de-energized by the switch prior to the expiration of the predetermined period. In such case, the timer actuates the valve mechanism controlling the addition of the viscosity adjusting liquid to the first mentioned liquid. Sequential operation of this apparatus effects a periodic measurement of the liquid viscosity and, by the periodic addition of a viscosity controlling liquid thereto, assures the maintenance of any desired substantially constant liquid viscosity.

It will be understood that the valve mechanism described above may be so connected as to initiate or terminate the addition of the viscosity adjusting liquid to the main stream of the liquid whose viscosity is to be adjusted. Hence the device of this invention may be utilized to increase or decrease the viscosity of any liquid whose viscosity may be measured employing a standard viscosity cup, e.g., inks, oils, paints, etc. It is therefore intended that the following detailed description of a preferred embodiment of the invention, involving an apparatus for measuring and controlling the viscosity of printing ink by the periodic addition of a thinning solvent thereto, is illustrative only.

The nature and objects of the present invention will, however, be clarified from a consideration of the following preferred embodiment thereof, taken in connection with the accompanying drawings in which:

FIGURE 3 is a vertical section viewed in the direction of the line 3—3 in FIGURE 2;

Figure 1:
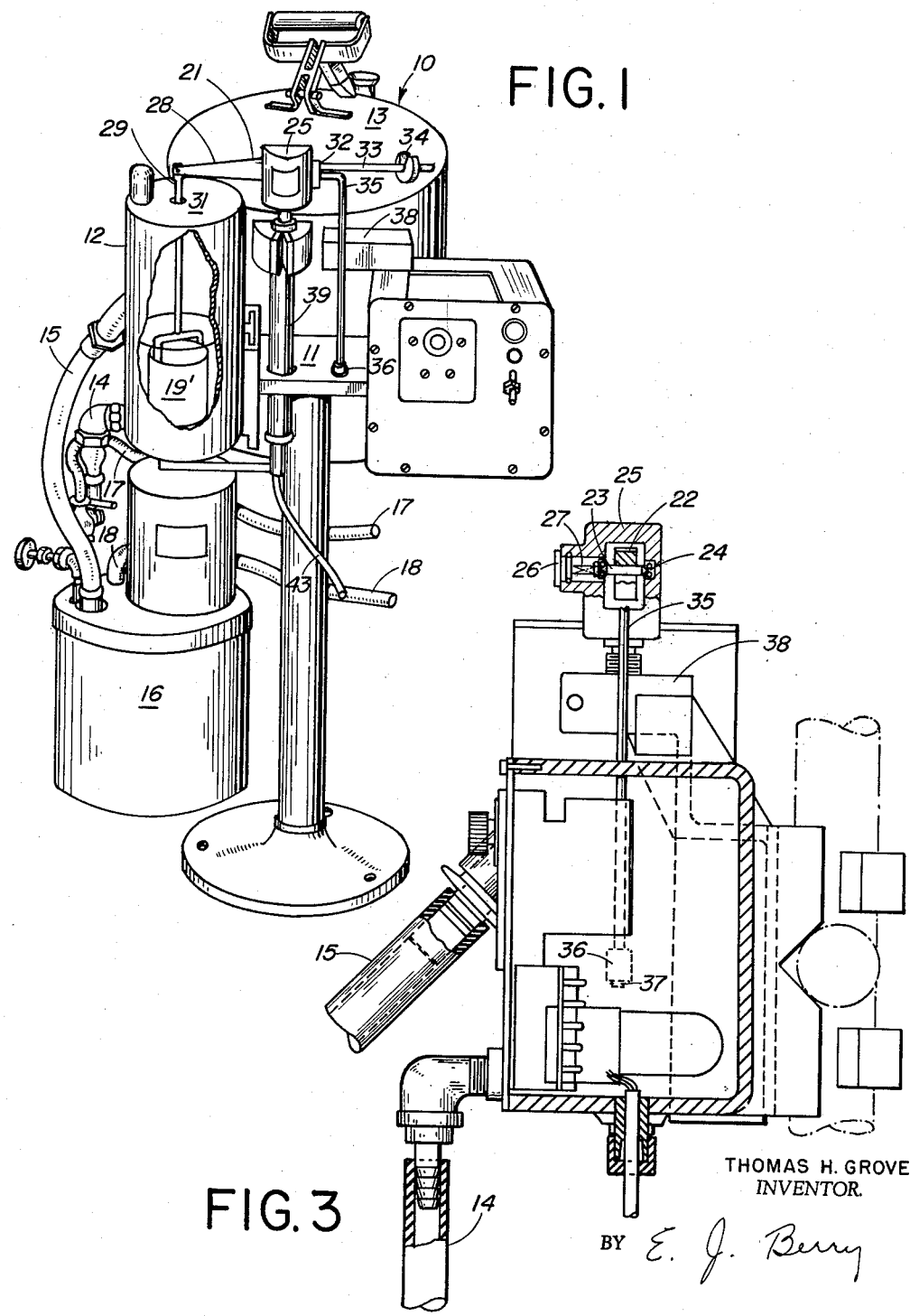
FIGURE 1 is a perspective view of the viscosity measuring and controlling device for regulating the viscosity of a printing ink.
Figure 2:
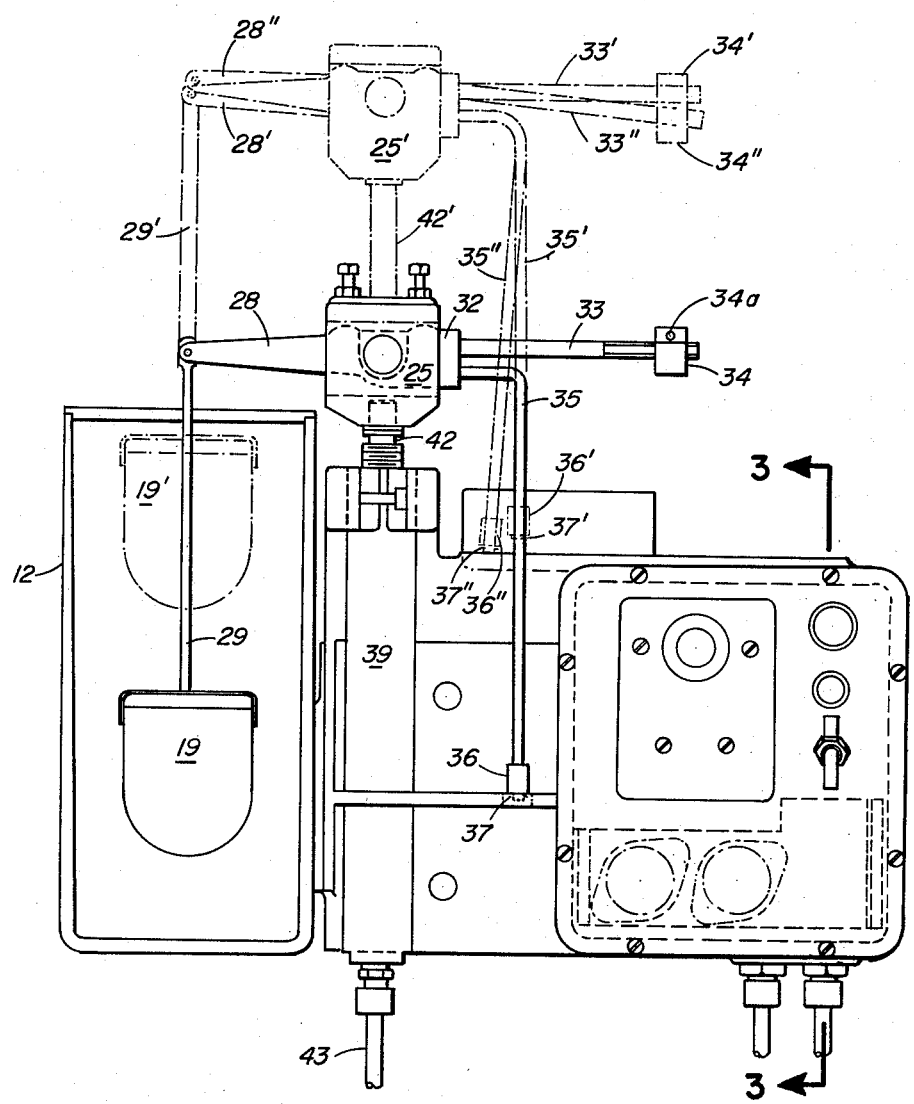
FIGURE 2 is a vertical section through the viscosity controller showing the beam balance and the associated components thereof in their several positions.

Referring initially to FIGURES 1 to 3 of the drawings, the viscosity controller, indicated generally at 10 includes a main supporting frame 11 upon which an ink reservoir 12 and the associated components for measuring the viscosity and controlling the injection of a solvent from a solvent supply tank 13 into an ink stream, are mounted. The ink reservoir is connected by supply and return lines 14 and 15, respectively, with an ink pump 16 which is, in turn, connected through lines 17 and 18 with a main ink stream, e.g., that feeding a printing press. A viscosity cup 19 is housed within the ink reservoir 12, supported by a beam balance assembly, indicated generally at 21.

The beam balance assembly 21 includes a balance beam 22 (see FIGURE 3) supported by a pivot 23 mounted in bearings 24 within a pivot housing 25. The bearings 24 are held within the pivot housing by a bearing pin 26 and an associated compression spring 27.

One arm 28 of the balance beam 22 supports a link 29 extending through the cover 31 of the ink reservoir 12 and supporting the viscosity cup 19 housed therein. The arm 28 is adapted to elevate and lower the viscosity cup 19 within the ink reservoir 12 from a position at which the top edge of the cup is below the surface of the ink therein, to a position in which the cup is elevated above the surface of the ink. Preferably, when the viscosity cup is in the lowered position shown in full line in FIGURES 1 and 2, its top edge is a minimum of about ¼ inch below the surface of the ink in the ink reservoir and when the cup is in its elevated position shown at 19′ in FIGURE 2, the bottom of the cup is a minimum of about ¾ of an inch above the surface of the ink in the ink reservoir. The cup 19, as will be described more fully hereinafter, has an aperture formed in the bottom thereof, such that when the cup is lowered beneath the ink level it is filled with ink and, when elevated above the ink level, is gradually emptied through such aperture, the time required to empty the cup depending upon the ink viscosity.

The other arm 32 of the beam balance assembly 21, opposite the arm 28, is bifurcated, one segment 33 thereof comprising a horizontally extending rod having a balance collar 34 mounted thereon. The balance collar 34 may be secured at various points along the length of segment or rod 33 and held thereat, as by set screw 34a. By changing the position of the balance collar, the equilibrium position of the balance beam assembly 21 is varied. The second segment 35 of arm 32 is an L-shaped rod having a vertically depending elongated portion having a plate 36 including a magnet element 37 secured at the end thereof. As will be described hereinafter, the magnet element 37 is adapted to actuate and de-actuate an encapsulated magnetic switch 38 during movement of the balance beam assembly 21 from one to another of its operative positions.

The pivot housing 25 of the beam balance assembly 21 is mounted upon a fluid pressure operated cylinder 39. The cylinder includes a vertically reciprocable piston rod 42 which, in the preferred embodiment illustrated, is actuated by air pressure through line 43. It will, however, be understood that hydraulic as well as pneumatic means may be employed to actuate the fluid pressure operated cylinder 39, if desired.

Figure 4:
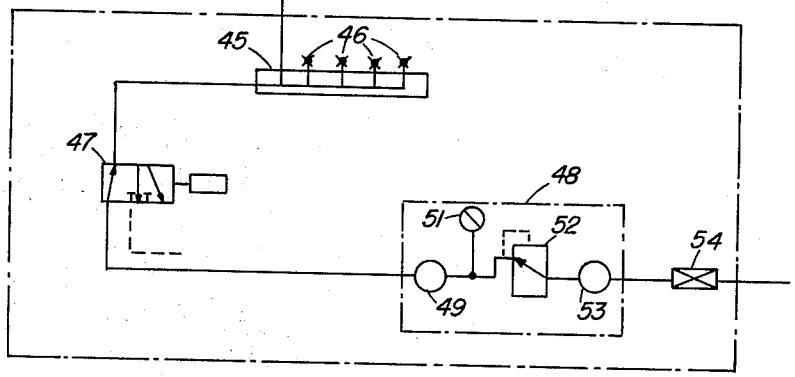
FIGURE 4 is a schematic drawing of the pneumatic system for positioning the beam balance of the viscosity controller.

The pneumatic operating mechanism for the cylinder 39 is illustrated in FIGURE 4 of the drawings. As shown therein the cylinder communicates with an orificed seal cap 44 which controls air flow to and from the cylinder, and which is connected in turn to a manifold 45. Further viscosity controllers for regulating the viscosity of the ink at different points in its flow may be attached to the manifold 45, as indicated at 46. A normally open solenoid actuated air supply valve 47 is connected in the air line 43, between the manifold 45 and an air purifying section, indicated generally at 48. The purifying section includes a lubricator 49, a pressure gauge 51, a pressure regulator 52 and an air filter 53. Connected in the air line leading from the main air supply to the purifying section 48 is a hand valve 54.

Figure 5:
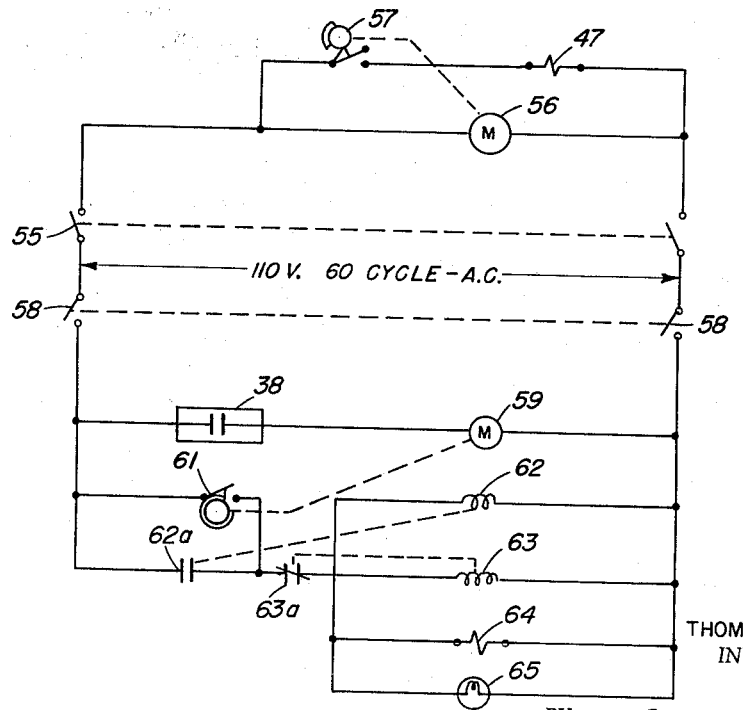
FIGURE 5 is a schematic circuit diagram of the electrical system of the viscosity controller.

The electrical circuit which initiates operation of the pneumatic system shown in FIGURE 4 is schematically illustrated in the upper half of FIGURE 5 of the drawings. The circuit includes a switch 55 connected across a power line, e.g., a 110 volt, 60 cycle A.C. line, in circuit with a repeat cycle timer motor 56 which, upon energization, drives a cam actuated timer microswitch 57 connected in parallel therewith. The normally open air supply valve 47 is connected in series with the timer microswitch 57. Upon closing the microswitch 57 the solenoid of valve 47 is actuated, the valve closing and remaining closed for a preset period during which air is exhausted from the cylinder 39, lowering the piston 42 thereof and the associated beam balance mechanism 21. Upon expiration of the preset period the timer microswitch 57 is opened, by the timer motor, de-energizing the valve 47 and permitting air to flow into cylinder 39 to thereby elevate the piston 42 and the associated beam balance mechanism.

The electrical circuit for effecting the addition of a thinning solvent to the ink when the viscosity thereof is in excess of a predetermined value is indicated schematically in the lower half of FIGURE 5 of the drawings. The circuit includes a switch 58 in circuit with the magnetic switch 38 and a spring return timer motor 59. The timer motor drives a cam actuated timer microswitch 61 which completes a circuit through the coils of a holding relay 62 and a time delay relay 63. Upon energizing the relay coils, the contacts 62a of the holding relay are closed and remain closed, whether or not the magnetic switch 38 subsequently de-energizes timer switch 61, until the contacts 63a of the time delay relay are opened automatically.

Connected in circuit with the time delay relay 63 are a solenoid operated solvent supply valve 64 and a signal light 65. When the time delay relay 63 is closed the valve 64 is energized, permitting the addition of a thinning solvent to the ink stream for a predetermined period of time. After such period of time, the time delay relay 63 times out, breaking the circuit to the solvent supply valve 64 and closing the same to thereby discontinue flow of the solvent to the ink stream. It will be noted that, once the time delay relay 63 is closed, in the manner described hereinafter, the solvent supply valve 64 effects addition of the thinning solvent to the ink stream for a predetermined time, irrespective of the subsequent de-energizing of the timer motor 59 by the magnetic switch 38.

The operation of the viscosity measuring and controlling device described above is as follows. Upon closing switch 55 the timer motor 56 drives a cam to actuate the timer microswitch 57, which is held in the closed position for a preset period of time, e.g., about 45 seconds. The air supply valve 47 is closed by the microswitch 57 throughout this period, exhausting the cylinder 39 and causing the piston rod 42 with the beam assembly 21 mounted thereon, to fall to the position shown in solid line in FIGURE 2. When the beam assembly is thus lowered the viscosity cup 19 suspended from the arm 28 thereof is lowered below the surface of the ink in the ink reservoir 12.

After the preset period of time has elapsed the timer microswitch 57 is opened by timer motor 56 and the air valve 47 is de-energized. Air then flows into the air cylinder through line 43, elevating the piston rod 42 and the beam balance assembly 21. When the ink-filled viscosity cup 19 is thus raised it causes the balance beam 22 to tip into a first equilibrium position. In this position the beam arm segment indicated at 33' is disposed substantially in a horizontal plane with the L-shaped depending portion 35 thereof positioned at 35'. As the beam balance moves into this first position, the magnet element 37 moves over the magnetic switch 38 and when positioned at 37', effects actuation of the switch, energizing the timer motor 59.

When thus elevated, the viscosity cup 19 is above the surface of the ink in the reservoir 12 and the ink flows from the cup through the standard size aperture in the bottom thereof. At the moment the viscosity cup is completely emptied, its decreased weight disrupts the equilibrium of the balance beam 22, causing the arm segment 33 thereof to pivot clockwise into the position 33'', shown in FIGURE 2. When the beam balance is thus pivoted into this second position the magnet element 37 moves away from the contacts of magnetic switch 38 to position 37''. The magnetic switch 38 is thus opened or de-actuated, de-energizing the timer motor 59.

If the viscosity of the ink is not above the desired value, the amount of time required for the ink to be emptied from the viscosity cup 19 is less than the time set in the timer motor 59. When the magnetic switch 38 thus opens, the timer motor is de-energized before it drives the cam to actuate the timer switch 61 and no solvent is added to the ink. The timer motor automatically resets itself for repeated operation.

If, on the other hand, the viscosity of the ink is higher than desired, more than the predetermined time set in the timer motor 59 is required for the ink to empty from the viscosity cup 19. In such case the timer motor 59, upon reaching the end of the predetermined period, actuates the timer switch 61, thereby energizing the solvent supply valve 64. The time delay relay 63 maintains the solvent flow for a predetermined period, e.g., about 5 seconds, thereafter. It will be understood that the solvent flow may be maintained for any desired time interval, depending upon the delay rating of the time delay tube employed in time delay relay 63.

The beam balance is maintained in its elevated position for a period sufficient to effect the viscosity measurement, e.g., for about 75 seconds, the timer motor 56 thereafter automatically closing the timer microswitch 57 to lower the beam balance and thus refill the viscosity cup 19 from the ink reservoir 12.

The viscosity measuring and controlling device is thus cyclically operated, the viscosity cup being periodically filled with ink when the beam balance assembly is maintained in its lowered position and thereafter elevated to its upper position, and maintained thereat for a time sufficient for the ink to flow from the cup, during which time the flow is timed by the mechanism described above and utilized to automatically add solvent in amounts necessary to maintain substantially constant ink viscosity.

The addition to a liquid whose viscosity is to be controlled of successive portions of a thinner or thickener in limited quantities, together with the periodic re-measurement of the viscosity of the liquid, facilitate accurate viscosity control. In the preferred embodiment described inks having viscosities of from about 5 Zahn-seconds to 55 Zahn-seconds have been accurately controlled within ±½ Zahn-second.

Since certain changes may be made in the viscosity measuring and controlling device described without departing from the scope of the present invention, it is intended that all matter contained in the above description and shown in the accompanying drawings shall be interpreted as illustrative and not in a limiting sense.

What is claimed is:

1. An apparatus for measuring and controlling the viscosity of a liquid comprising:
   (a) a beam balance;
   (b) a viscosity cup supported from one arm of the beam balance for containing a liquid whose viscosity is to be controlled, the cup having an aperture therein permitting the liquid to be emptied from the cup and thereby changing the angular disposition of the beam balance;
   (c) a first switch means associated with the other arm of the beam balance, the switch means being closed when the beam balance is disposed in a first angular position and being open when the beam balance is disposed in a second angular position;
   (d) a timer mechanism including:
      (1) timing means electrically connected to said first switch means, said timing means being actuated by closing said first switch means and de-actuated by opening said first switch means,
      (2) a second switch means trippable by the actuated timing means a pre-determined period of time after said timing means is actuated, and
      (3) time delay means in electrical circuit with and actuated by said second switch means, said time delay means being operable for a preset period after actuation by said second switch means; and
   (e) valve means in electrical circuit with said time delay means and being actuated thereby for the duration of said preset period, said valve means controlling the addition of a viscosity adjusting liquid to said first mentioned liquid.

2. The apparatus of claim 1, in which said first switch means comprises a magnetic element carried by said other arm of the beam balance and a magnetic switch having contacts which are opened and closed by said magnetic element; and in which said timer mechanism includes
   (1) a timer motor in electrical circuit with said magnetic switch and actuated thereby;
   (2) a cam operated by the actuated timer motor;
   (3) a timer microswitch tripped by said cam a predetermined period of time after said timer motor is actuated, and
   (4) a holding relay and a time delay relay in electrical circuit with and actuated by said timer microswitch, the contacts of said relays remaining closed and effecting actuation of said valve means for the duration of said preset period after actuation by said timer microswitch.

3. An apparatus for measuring and controlling the viscosity of a liquid comprising
   (a) a beam balance;
   (b) a viscosity cup supported from one arm of the beam balance for containing a liquid whose viscosity is to be controlled, the cup having an aperture therein permitting the liquid to be emptied from the cup and thereby disrupting the equilibrium of the beam balance;
   (c) a first switch means associated with the other arm of the beam balance, the switch means being closed when the beam balance is disposed in a first equilibrium position and being opened when the equilibrium of the beam valance is disrupted;
   (d) a timer mechanism including:
      (1) timing means electrically connected to said first switch means, said timing means being actuated by closing said first switch means and de-actuated by opening said first switch means,
      (2) a second switch means trippable by the actuated timing means a pre-determined period of time after said timing means is actuated, and
      (3) time delay means in electrical circuit with and actuated by said second switch means, said time delay means being operable for a preset period after actuation by said second switch means; and
   (e) valve means in electrical circuit with said time delay means and being actuated thereby for the duration of said preset period, said valve means controlling the addition of a viscosity adjusting liquid to said first mentioned liquid.

4. An apparatus for measuring and controlling the viscosity of ink employed on a printing press, comprising:
   (a) a beam balance;
   (b) a viscosity cup supported from one arm of the beam balance for containing said ink, the cup having an aperture therein permitting the ink to be emptied from the cup and thereby changing the angular disposition of the beam balance;
   (c) a first switch means associated with the other arm of the beam balance, the switch means being closed when the beam balance is disposed in a first angular position corresponding to the angular position of said cup when filled with ink and being open when said beam balance is disposed in a second angular position;
   (d) a timer mechanism including:
      (1) timing means electrically connected to said first switch means, said timing means being actuated by closing said first switch means and de-actuated by opening said first switch means,
      (2) a second switch means trippable by the actuated timing means a pre-determined period of time after said timing means is actuated, and
      (3) time delay means in electrical circuit with and actuated by said second switch means, said time delay means being operable for a preset period after actuation by said second switch means; and
   (e) valve means in electrical circuit with said time delay means and being actuated thereby for the duration of said preset period, said valve means controlling the addition of a thinning solvent to the ink.

5. An apparatus for measuring and controlling the viscosity of a liquid comprising:
   (a) a beam balance;
   (b) a viscosity cup supported from one arm of the beam balance for containing a liquid whose viscosity is to be controlled, the cup having an aperture therein permitting the liquid to be emptied from the cup and thereby changing the angular disposition of the beam balance;
   (c) a reservoir for containing said liquid;
   (d) fluid pressure operated means for moving said beam balance between a first vertical position at which said viscosity cup is completely immersed in the liquid within said reservoir and a second vertical position at which said viscosity cup is elevated above the liquid level in said reservoir thereby permitting the liquid to drain from said cup;
   (e) a first switch means associated with the other arm of said beam balance, said switch means being closed when the arms of said beam balance are disposed in a first angular position and being opened when the arms of said beam balance are disposed in a second angular position;

(f) a timer mechanism including:
(1) timing means electrically connected to said first switch means, said timing means being actuated by closing said first switch means and de-actuated by opening said first switch means,
(2) a second switch means trippable by the actuated timing means a pre-determined period of time after said timing means is actuated, and
(3) time delay means in electrical circuit with and actuated by said second switch means, said time delay means being operable for a preset period after actuation by said second switch means; and (g) valve means in electrical circuit with said time delay means and being actuated thereby for the duration of said preset period, said valve means controlling the addition of a viscosity adjusting liquid to said first mentioned liquid.

6. The apparatus of claim 5, in which said fluid pressure operated means includes
switch means;
timing means in electrical circuit with and actuated by said last mentioned switch means;
further switch means trippable by said timing means and maintained thereby in the tripped position for a pre-determined period; and
valve means in electrical circuit with said last mentioned switch means and being actuated by the tripped switch means for the duration of said pre-determined period to effect the release of a motive fluid under pressure to thereby move said beam balance from one to the other of said vertical positions.

7. The apparatus of claim 5, in which said fluid pressure operated means includes
a fluid pressure cylinder;
a vertically reciprocable piston rod mounted within said cylinder and secured at one end to said beam balance, said piston rod being operated by fluid pressure produced within said cylinder;
a power switch;
a timer motor in electrical circuit with and actuated by said power switch;
a cam operated by said timer motor;
a timer microswitch closed by said cam and maintained in its closed position for a predetermined period; and
a fluid supply valve connected with said microswitch and actuated thereby for the duration of said predetermined period to thereby exhaust fluid from said cylinder effecting vertical movement of said beam balance between said first and second vertical positions.

References Cited by the Examiner
UNITED STATES PATENTS

| | | | |
|---|---|---|---|
| 2,955,459 | 10/60 | Cihelka | 137—92 XR |
| 2,973,000 | 2/61 | Pearson | 137—92 XR |
| 3,073,330 | 1/63 | Flattor | 137—93 |

FOREIGN PATENTS

| | | |
|---|---|---|
| 704,765 | 3/54 | Great Britain. |

M. CARY NELSON, *Primary Examiner.*

ISADOR WEIL, *Examiner.*